FIP8107 XR 3,784,915

364/574 XS477W XS481R XS407T

United States Patent [11] 3,784,915
Oswald et al. [45] Jan. 8, 1974

[54] APPARATUS FOR IMPROVING THE SIGNAL-TO-NOISE RATIO OF A RECEIVED SIGNAL

[75] Inventors: Jacques Oswald, Versailles; Yves Rainsard, Antony, both of France

[73] Assignee: Compagnie Industrielle Des Telecommunications Cit-Alcatel, Paris, France

[22] Filed: June 16, 1971

[21] Appl. No.: 153,620

[30] Foreign Application Priority Data

June 16, 1970 France ............ 7022111

[52] U.S. Cl. ............ 325/367
[51] Int. Cl. ............ H04b 1/06
[58] Field of Search ............ 325/42, 65, 305, 325/367, 369, 371, 473–476; 328/162, 165, 166

[56] References Cited

UNITED STATES PATENTS

| | | | |
|---|---|---|---|
| 3,652,939 | 3/1972 | Levasseur | 325/367 |
| 3,036,210 | 5/1962 | Lehan et al. | 325/367 |

*Primary Examiner*—Howard W. Britton
*Assistant Examiner*—F. Konzem
*Attorney*—Craig, Antonelli and Hill

[57] ABSTRACT

Device for improving the signal/noise ratio of a common signal received on three aerials utilizing correlation between the sum and difference values of combinations of the signals from the three aerials to eliminate or substantially suppress the noise received with the common signal.

4 Claims, 3 Drawing Figures

APPARATUS FOR IMPROVING THE SIGNAL-TO-NOISE RATIO OF A RECEIVED SIGNAL

The present invention concerns apparatus for improving the signal-to-noise ratio of a signal.

The apparatus is particularly suitable for improving the signal-to-noise ratio of a common signal received by three transducers. These transducers may be radio aerials in the case of picking up radio transmissions, electroaccoustic transducers in the case of underwater accoustic signals (sonar), or such other forms of transducer as may be required for a particular application. For the sake of convenience, the remainder of the specification will refer to these transducers as aerials, but it will be appreciated that these other forms of transducer are included in the description.

It will be supposed that the three signals have a constant frequency $f_o$, possibly with a fairly slow amplitude modulation so that the total band width involved is low in relation to the frequency $f_o$. It is further supposed that the signals, before being treated for reducing their signal-to-noise ratio, will be amplified and filtered so as to have the same instantaneous amplitude and phase.

Improvements in the signal-to-noise ratio in receiving systems with several aerials have been generally described in an article by Henri n—in the French Review "Annales des Telecommunications" Vol. 18, 1963, No: 7–8, pages 126 to 140, as well as in French patents in the name of Henri Mermoz.

Mermoz has shown that with a system including $n$-aerials, it is possible, under certain conditions, to remove $(n-1)$ sources of noise.

In our copending application, Ser. No: 143,337 filed May 14, 1971, now U.S. Pat. No. 3,737,783 issued June 5, 1973, there is described apparatus for improving the signal-to-noise ratio of a received signal, comprising: first and second input terminals connected to receive respective first and second signals $S_1(t)$ and $S_2(t)$ with respective noise levels $b_1(t)$ and $b_2(t)$, the first and second signals being evolved from a common signal $S(t)$ of frequency $f_o = 1/T_o$; addition and subtraction circuitry connected to receive the first and second signals and arranged to form respectively their sum $U = S_1(t) + S_2(t)$ and their difference $V = S_1(t) - S_2(t)$; circuitry for forming the quantities $h'V$ and $h''V(t - T_o/4)$, where:

$h' = (B_2 - B_1) / (B_1 + B_2 - 2B_{12})$; and $h'' = 2B'_{12}/(B_1 + B_2 - 2B_{12})$;

and further circuitry for forming the sum $U + 0\, h'\, V + h''\, V(t - T_o/4)$ constituting an output signal $S_o(t)$ with improved signal-to-noise ratio, where $B_1$ and $B_2$ are respectively the mean values of the squares of $b_1(t)$ and $b_2(t)$, $B_{12}$ being the mean value of the product $b_1(t)\, b_2(t)$ and $B'_{12}$ being the mean value of the product $b_1(t)\, b_2(t - T_o/4)$.

This apparatus provides an improvement in the signal-to-noise ratio of a common signal received on two transducers. The present invention is intended to extend this facility to a common signal received by three transducers.

In accordance with the invention there is provided apparatus for improving the signal-to-noise ratio of a common signal received by three transducers, comprising circuitry for providing from the three transducer outputs three signals $S_1$, $S_2$, $S_3$ differing only in their noise contents; a first subtractor for forming the difference $V_1 = S_1 - S_3$; a second subtractor for forming the difference $V_2 = S_2 - S_3$; a first summator for forming the sum $U = S_1 + S_2 + S_3$; a first regulator for forming the signal $\hat{V}_1$ (as herein defined); a second regulator for forming the signal $\hat{V}_2$; a second summator for forming the sum $W_1 = \hat{V}_1 + \hat{V}_2$; a third subtractor for forming the difference $W_2 = \hat{V}_1 - \hat{V}_2$; a third regulator for forming the signal $\hat{W}_1$; a fourth regulator for forming the signal $\hat{W}_2$; a first phase quadrature circuit for forming the signal $j\hat{W}_2$; a third summator for forming the sum $T_1 = \hat{W}_1 + j\hat{W}_2$; a fourth subtractor for forming the difference $T_2 = \hat{W}_1 - j\hat{W}_2$; a fifth regulator for forming the signal $\hat{T}_1$; a sixth regulator for forming the signal $\hat{T}_2$; a second phase quadrature circuit for forming the signal $j\hat{T}_1$; a third phase quadrature circuit for forming the signal $j\hat{T}_2$; a first correlator-multiplier assembly (as herein defined) connected to receive the signals $U$, $\hat{T}_1$ and $j\hat{T}_1$; a second correlator-multiplier assembly connected to receive the signals $U$, $\hat{T}_2$ and $j\hat{T}_2$; a fourth summator for forming the sum $P$ of the correlator-multiplier assembly outputs; and a fifth subtractor for forming the difference $Q = U - P$.

The invention will now be described in more detail, by way of example only, with reference to the accompanying diagrammatic drawings in which.

Reference is made to the above-mentioned copending application for a full description of the two aerial system, which will be summarized here.

A signal received from a common source is received on aerial 11 and 12. The aerials 11 and 12 are respectively connected to circuits $K_1$ and $K_2$, each circuit including amplifiers and narrow band filters centered on the common frequency $f_o$ of the received signal, which provides at their respective outputs, signals $S_1$ and $S_2$. These output signals differ only in their respective noise contents and they may be represented by:

$S_1 = S + b_1$ and $S_2 = S + b_2$.

The signals $S_1$ and $S_2$ are respectively added and subtracted to provide the sum $U = S_1 + S_2$ and difference $V = S_1 - S_2$.

The difference $V$ is applied to an amplitude regulator $Q$ which provides at its output a signal $T$ of substantially constant effective value. It suitably includes an amplifier with an automatic gain control circuit arranged to vary the gain in accordance with the mean quadratic value of the amplifiers output signal, obtained through a rectifier. Alternatively, the regulator may include an amplitude limiter and a narrow band-pass filter centered on the frequency $f_o$.

The signal $T$ is applied to a phase shifting circuit $\Phi$ providing at its output a signal $T'$ with a lag of $\pi/2$, or possibly $3\pi/2$. The signals $U$ and $T'$ are applied to a first correlator-multiplier device $Y_1$ providing at its output the signal $T' \cdot \overline{UT'}$. The signals $U$ and $T$ are applied to a second correlator-multiplier device $Y_2$ providing at its output the signal $T \cdot \overline{UT}$. These correlator-multiplier devices are described in more detail in the above-mentioned copending application, the contents of which are hereby inserted by reference.

The outputs of devices $Y_1$ and $Y_2$ are added to provide a signal $P$ which is subtracted from the signal $U$ to provide at an output terminal 14 the difference signal $U - P$. As is shown in detail in the above-mentioned co-pending application, the difference $U - P$ consists of the signal $S$ with the noise substantially eliminated. As the useful signal $S$ is identical in each of signals $S_1$ and $S_2$, the difference signal $V$ is theoretically pure noise. This is treated so as to have precisely the same phase as in the signal $U$, this operation being carried out by the correlator-multiplier devices and phase shifting circuit contained in dotted frame G in FIG. 1 and forming a correlator-multiplier assembly. The signal $P$ is theoretically identical to the noise content of the signal $U$, so that the difference $U - P$ is theoretically noiseless.

Figures 1, 2:
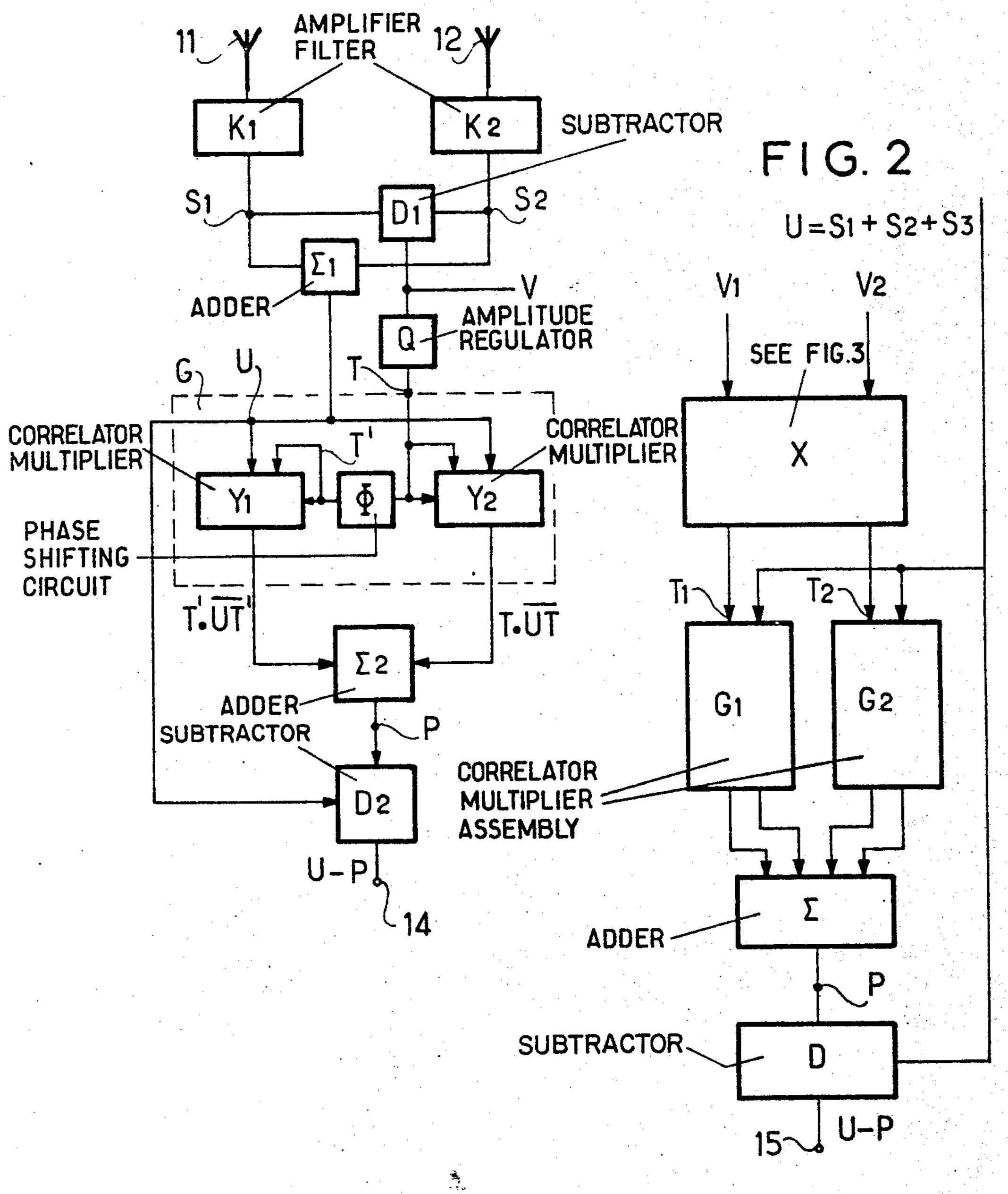
FIG. 1 is a block diagram of the apparatus described in the above-mentioned copending application.
FIG. 2 is a block diagram showing the extension of the system to a three aerial arrangement.

The system for three signal components is developed in an analogous manner, as shown by FIG. 2. If three aerials (or other transducers) provide three signals $S_1$, $S_2$ and $S_3$ which differ only in their noise contents, it is possible to form the sums $U = S_1 + S_2 + S_3$ and the differences $V_1 = S_1 - S_3$ and $V_2 = S_2 - S_3$.

It is supposed that the signals $V_1$ and $V_2$ are applied to a circuit X providing at its output signals $T_1$ and $T_2$ analogous to the signal $T$ of FIG. 1. Signals $T_1$ and $T_2$ are applied to respective assemblies $G_1$ and $G_2$, each identical to the assembly G of FIG. 1 and also connected to receive the signal $U$. The four outputs of the assemblies $G_1$, $G_2$ are added to provide a signal $P$ which is a pure noise signal identical to the noise content of the signal $U$. $P$ is subtracted from $U$ in a subtractor D, to provide at an output terminal 15 a substantially noise-free signal $U - P$.

Figure 3:
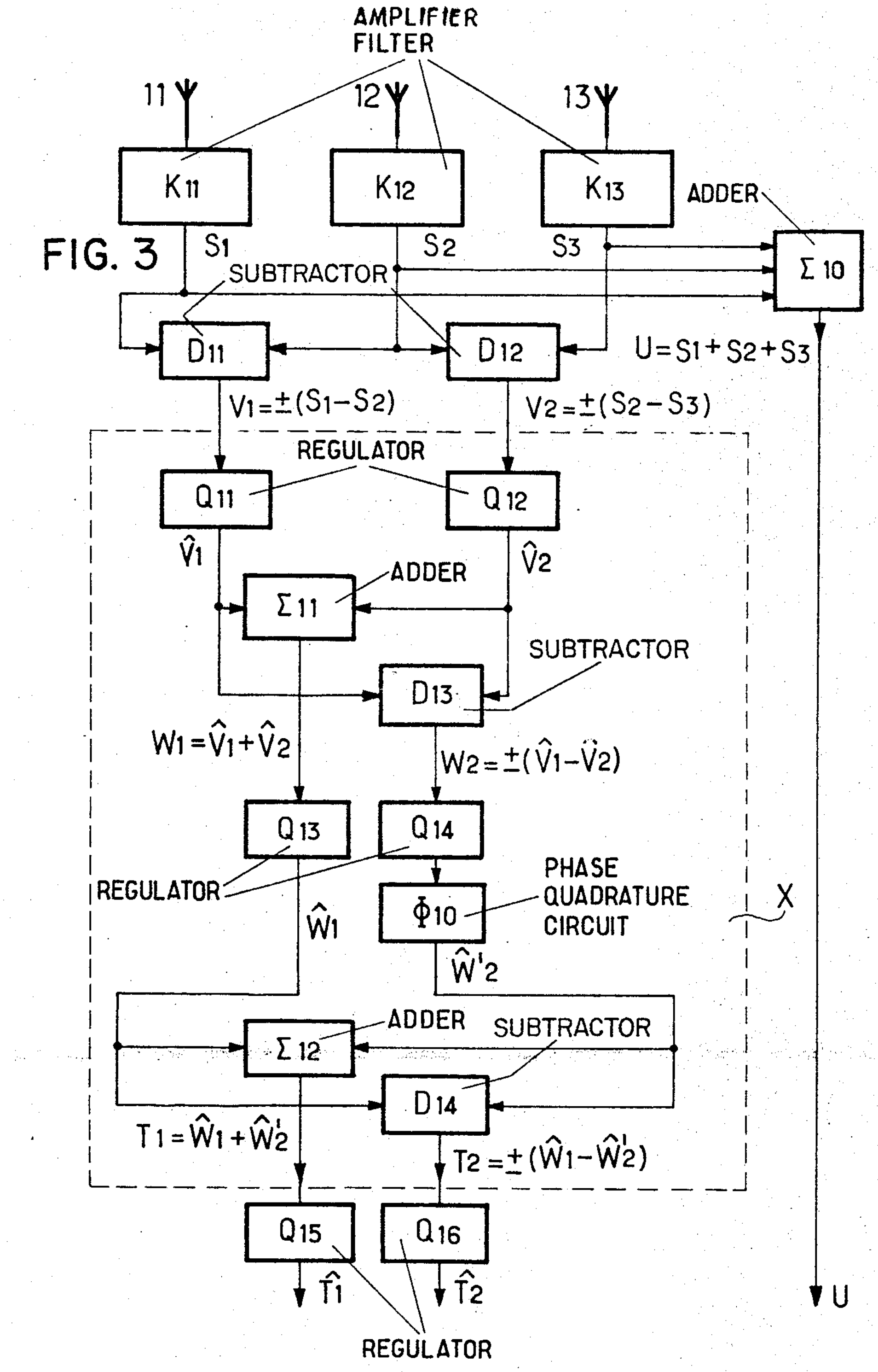
FIG. 3 is a more detailed block diagram of one element of FIG. 2.

The circuit X is shown in more detail in FIG. 3, and is designed in accordance with the following considerations.

The three signals $S_1$, $S_2$ and $S_3$ are defined as follows:

$$\left.\begin{aligned} S_1 &= S(t) + B_{11}(t) + B_{12}(t) \\ S_2 &= S(t) + B_{21}(t) + B_{22}(t) \\ S_3 &= S(t) + B_{31}(t) + B_{32}(t) \end{aligned}\right\} \quad (1)$$

The sum $U$ and differences $V_1$, $V_2$ are defined as follows:

$$\left.\begin{aligned} U(t) &= S_1 + S_2 + S_3 \\ V_1(t) &= \pm(S_1 - S_3) \\ V_2(t) &= \pm(S_2 - S_3) \end{aligned}\right\} \quad (2)$$

Thus:

$$\left.\begin{aligned} U &= 3S + U_1 + U_2 = (3S + U_1 + U_2)\, e^{jw_0t} \\ V_1 &= \pm(S_1 - S_3) = (V_{11} - V_{12})\, e^{jw_0t} \\ V_2 &= \pm(E_2 - E_3) = (V_{21} - V_{22})\, e^{jw_0t} \end{aligned}\right\} \quad (3)$$

Where $U_j$, $V_{1k}$, $V_{2k}$ are slowly varying complex amplitudes depending only on the relevant noise signal.

Thus:

$$Re\,[U_k\, e^{jw_0t}] = B_{1k}(t) + B_{2k}(t) + B_{3k}(t) \quad (k = 1, 2)$$
$$Re\,[V_{1k}\, e^{jw_0t}] = B_{1k}(t) - B_{3k}(t) \quad (k = 1, 2)$$
$$Re\,[V_{2k}\, e^{jw_0t}] = B_{2k}(t) - B_{3k}(t) \quad (k = 1, 2)$$

The signals $T_1$ and $T_2$ are defined as follows:

$$\left.\begin{aligned} T_1 &= \sqrt{2}\,(A_{11} + A_{12})\, e^{jw_0t} \\ T_2 &= \sqrt{2}\,(A_{21} + A_{22})\, e^{jw_0t} \end{aligned}\right\} \quad (4)$$

Where $A_{11}$ and $A_{21}$ depend only on the noise signal 1 and $A_{12}$, $A_{22}$ only on noise signal 2.

The signal $R$ is defined as follows:

$$P = Re\,(P) = ½\, Re\,(T_1 \cdot \overline{UT_1^*} + T_2\overline{U \cdot T_2^*})$$

It is supposed that the signal source and each of the noise sources are independent, and that the noise sources are independent of one another. In thecircumstances: $P = ½\Sigma_k T_k\ UT_k^* = e^{jw_0t}\,[(A_{11}\ U_1A_{11}^* + A_{21} \cdot U_1A_{21}^*) + (A_{11}\ U_2 \cdot A_{12}^* + A_{21}\ U_2 \cdot A_{22}^*)]e^{jw_0t}\,[(A_{12} \cdot U_2 \cdot A_{12}^* + A_{22}\ U_2 \cdot A_{22}^*) + (A_{12}\ U_1A_{11}^* + A_{22}U_1\ A_{21}^*)]$ It has been supposed that the complex amplitudes are slowly variable, so that it is possible to choose the periods in which the average values are calculated so that during these periods no two values of $U_p\ A_q$ are identical, whatever the values of $p$ and $q$. Thus:

$$P = e^{jw_0t}\,[U_1(A_{11}A_{11}^* + A_{21}A_{21}^*) + U_2(A_{11}A_{12}^* + A_{21}A_{22}^*)] + e^{jw_0t}\,[U_2(A_{12}A_{12}^* + A_{22}A_{22}^*) + U_1(A_{11}^*\ A_{12} + A_{22}A_{21}^*)]$$

Thus if:

$$\begin{aligned} &a. \quad A_{11}A_{11}^* + A_{21}A_{21}^* = |A_{11}|^2 + |A_{21}|^2 = 1 \\ &b. \quad A_{12}A_{12}^* + A_{22}A_{22}^* = |A_{12}|^2 + |A_{22}|^2 = 1 \qquad (5) \\ &c. \quad A_{11}A_{12}^* + A_{21}A_{22}^* = (A_{11}A_{12}^* + A_{21}A_{22}^*)^* = 0 \end{aligned}$$

Then:

$$P = (U_1 + U_2)e^{jw_0t}$$

and:

$$Re\,(U) - Re\,(P) = U - P = Re(3S\, e^{jw_0t}) \quad (6)$$

Thus forming the differences $U - P$ is able to eliminate the noise signals.

From the three equations:

$$\left.\begin{aligned} &a. \quad A_{11}A_{11}^* + A_{12}A_{12}^* = 1 \\ &b. \quad A_{21}A_{21}^* + A_{22}A_{22}^* = 1 \\ &c. \quad A_{11}A_{21}^* + A_{12}A_{22}^* = 0 \end{aligned}\right\} \quad (7)$$

From equation 7c:

$$A_{22}^* = A_{11}A_{21}^*/A_{12}$$

Equation 7b may be written:

$$A_{21}A_{21}^* + (A_{11}^*A_{21}/A_{12}^*)\,(A_{11}A_{21}^*/A_{12}) = 1$$

or:

$$A_{21}A_{21}^*\,(A_{11}A_{11}\& + A_{12}A^{12*}) = A_{12}A_{12}^*$$

Thus, taking account of equation 7a:

$$A_{21}A_{21}^* = A_{12}A_{12}^*$$

Thus, from equation 7c:

$$A_{11}A_{21}^* + A_{12}A_{22}^* = 0 = A_{11}A^A{}_{21}^* + A_{12}A_{12}^*A_{22}^* = A_{11}A_{12}^*A_{21}^* + A_{21}A_{21}^*A_{22}^*$$

also:

$$A_{11}A_{21}^* + A_{12}A_{22}^* = A_{11}A_{12}^* + A_{21}A_{22}^* = 0$$

Thus conditions (5) are satisfied when relations (7) are verified.

The mean powers of signals $T_1$ and $T_2$ are respectively:

$$A_{11}A_{11}^* + A_{12}A_{12}^*$$
$$A_{21}A_{21}^* + A_{22}A_{22}^*$$

and that:

$$\overline{T_1\ T_2^*} = 2\overline{(A_{11} + A_{12})\,(A_{21}^* + A_{22}^*)} = 2\,(A_{11}A_{21}^* + A_{12}A_{22}^*)$$

Consequently, the noise from the two noise sources may be eliminated from the treated signal if:

signals $T_1$ and $T_2$ are each of unit power; and their complex intercorrelation $\overline{T_1T_2^*}$ is 0.

Referring now to FIG. 3, three aerials 11, 12 and 13 with respective circuits $K_{11}$, $K_{12}$ and $K_{13}$ provide signals $S_1$, $S_2$ and $S_3$ which are identical in magnitude and phase, differing only in their noise contents. They are added in a sum circuit $\Sigma$ 10 to provide the sum $U = S_1 + S_2 + S_3$.

A first subtractor $D_{11}$ provides the difference $V_1 = \pm(S_1 - S_2)$. A second subtractor $D_{12}$ provides the difference $V_2 = \pm(S_2 - S_3)$. The outputs of subtractors $D_{11}$ and $D_{12}$ are applied to the circuit X (see FIG. 2). Regulators $Q_{11}$ and $Q_{12}$ provide the respective signals $\hat{V}_1$ and $\hat{V}_2$. A sum circuit $\Sigma$ 11 provides the sum $W_1 = \hat{V}_1 + \hat{V}_2$. A substractor $D_{13}$ provides the difference $W_2 = \pm(\hat{V}_1 - \hat{V}_2)$. Regulators $Q_{13}$ and $Q_{14}$ provide the respective signals $\hat{W}_1$ and $\hat{W}_2$, the latter of which passes through a phase quadrature circuit Φ 10 providing at its output the signal $j\hat{W}_2$ or $\hat{W}'_2$.

A sum circuit Σ 12 provides the sum $T_1 = \hat{W}_1 + \hat{W}'_2$. A subtractor $D_{14}$ provides the difference $T_2 = \pm(\hat{W}_1 - \hat{W}'_2)$. Regulators $Q_{15}$ and $Q_{16}$ provide the respective signals $\hat{T}_1$ and $\hat{T}_2$. These applied together with the signal $U$ to the correlator-multiplier assemblies $G_1$ and $G_2$ (see FIG. 2). The signals $\hat{V}_1$ and $\hat{V}_2$ comprise the signals $V_1$ and $V_2$ with amplitudes reduced to a predetermined fixed value by the corresponding regulators (see our above-mentioned copending application). Signals $\hat{T}_1$, $\hat{T}_2$, $\hat{W}_1$ and $\hat{W}_2$ are analogously related to signals $T_1$, $T_2$, $W_1$ and $W_2$.

We claim:

1. Apparatus for improving the signal-to-noise ratio of a common signal received by three transducers, comprising first circuit means for deriving from said three transducers, first, second and third signals differing only in their noise content, first subtractor means for providing an output corresponding to the difference between said first and second signals, second subtractor means for providing an output corresponding to the difference between said second and third signals, first summing means for providing an output corresponding to the sum of said first, second and third signals, third subtractor means for providing an output corresponding to the difference between the outputs of said first and second subtractor means, second summing means for providing an output corresponding to the sum of the outputs of said first and second subtractor means, first phase quadrature circuit means connected to the output of said third subtractor means for shifting the phase thereof, third summing circuit means for summing the outputs of said first phase quadrature circuit means and said second summing circuit means, fourth subtractor means for producing an output corresponding to the difference between the outputs of said first phase quadrature circuit means and said second summing circuit means, second phase quadrature circuit means connected to the output of said third summing means, third phase quadrature circuit means connected to the output of siad fourth subtractor means, first correlator-multiplier means connected to the outputs of said first and third summing means and said second phase quadrature circuit means for correlating and multiplying the output signals thereof, second correlator-multiplier means connected to the outputs of said first summing means, said fourth subtractor means and said third phase quadrature circuit means for correlating and multiplying the output signals thereof, fourth summing means for summing the outputs of said first and second correlator-multiplier means, and fifth subtractor means for providing an output corresponding to the difference between the output of said first summing means and said fourth summing means.

2. Apparatus as defined in claim 1 wherein a first amplitude regulator is connected between said first subtractor and the inputs of said third subtractor means and said second summing means.

3. Apparatus as defined in claim 2 wherein a second amplitude regulator is connected between said second subtractor and the inputs of said third subtractor means and said second summing means.

4. Apparatus as defined in claim 1 wherein each of said correlator multiplier means includes correlation means for generating a signal representative of polarity coincidence of components of the signals applied thereto.

* * * * *